Figure 1:
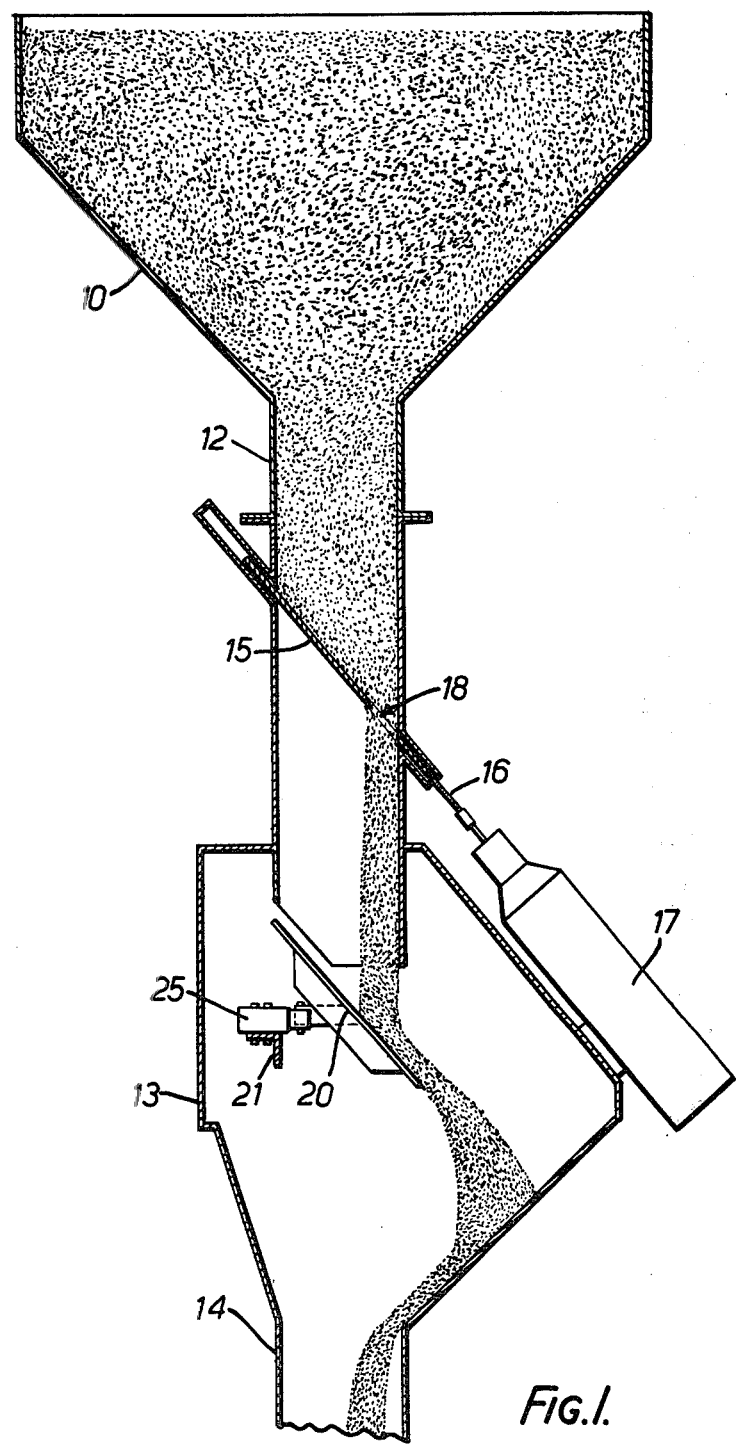

United States Patent [19]

Wood

[11] 4,354,622
[45] Oct. 19, 1982

[54] FLOW CONTROL SYSTEMS

[75] Inventor: Douglas A. Wood, Usk, Wales

[73] Assignee: Technicon Isca Limited, Gwent, Wales

[21] Appl. No.: 202,630

[22] Filed: Oct. 31, 1980

Related U.S. Application Data

[63] Continuation of Ser. No. 931,801, Aug. 7, 1978, abandoned.

[30] Foreign Application Priority Data

Aug. 11, 1977 [GB] United Kingdom ............... 33644/77

[51] Int. Cl.$^3$ .............................................. G01F 1/30
[52] U.S. Cl. .................................. 222/55; 73/861.73; 340/606; 340/610
[58] Field of Search ........................... 222/55, 56, 63; 73/861.73; 340/606, 609, 610, 611, 614, 617; 251/205, 326

[56] References Cited

U.S. PATENT DOCUMENTS

| | | | |
|---|---|---|---|
| 1,813,519 | 7/1931 | Varusky | 222/56 |
| 2,273,330 | 2/1942 | Robinson | 222/55 |
| 2,343,722 | 3/1944 | Wagner | 222/55 |
| 2,803,427 | 8/1957 | Wood | 251/326 |
| 2,872,074 | 2/1959 | Birtwell et al. | 222/55 |
| 3,232,486 | 2/1966 | Ofner | 73/861.73 X |
| 3,329,313 | 7/1967 | Mayer | 222/56 |
| 3,334,675 | 8/1967 | Satake | 222/56 X |
| 3,362,585 | 1/1968 | Nessim et al. | 222/55 |
| 3,611,803 | 10/1971 | Kajiura et al. | 73/861.73 |
| 3,640,135 | 2/1972 | Tomiyasu et al. | 73/861.73 |
| 3,742,762 | 7/1973 | Tomiyasu | 73/861.73 |
| 3,887,110 | 6/1975 | Porter | 222/63 X |
| 3,945,532 | 3/1976 | Marks | 222/55 |
| 4,058,012 | 11/1977 | Gauch | 222/55 X |

Primary Examiner—Robert J. Spar
Assistant Examiner—Edward M. Wacyra
Attorney, Agent, or Firm—Trexler, Bushnell & Wolters, Ltd.

[57] ABSTRACT

Apparatus for controlling the rate of flow of a powdered solid material such as flour, comprising a load cell supporting an inclined plate onto which the flour particles impinge after falling through an inclined gate valve. The output of the load cell is fed to a control circuit including a direct proportional control section and an integrated error section with a monitor circuit sensitive to excessive integrated errors. The control circuit acts on an electric motor controlling the opening of the gate valve to maintain a predetermined rate of flow.

8 Claims, 3 Drawing Figures

FLOW CONTROL SYSTEMS

This application is a continuation, of application Ser. No. 931,801, filed Aug. 7, 1978, now abandoned.

This invention relates to apparatus for sensing and controlling the flow rate of a particulate material, and is particularly though not exclusively applicable to the control of flow rate of grain in the food industry, such as in the blending of grain to form a specific flour blend.

It is an object of the invention to provide an improved reliable flow rate controller for such purposes, and further details and advantages of the invention will become apparent from the following description.

Broadly stated the invention consists in apparatus for controlling the rate of flow of a particulate material, comprising a flow control valve or gate positioned above a flow rate sensor, which includes an inclined plate onto which the particles will impinge and an electro-mechanical load cell for sensing the force exerted on the plate by the particles, and an electrical control circuit having an input from the sensor and an output connected to a motor for controlling the valve or gate.

Preferably the valve or gate is mounted in or across a generally vertical duct or passage with the load sensor positioned at a lower point in the same duct or passage.

In a preferred construction the apparatus includes an electrical motor connected via a reduction gear transmission such as a lead screw to a moving part of the valve or gate. It is also preferred that the inclined plate be supported directly by the load sensor to be movable linearly over a very small distance in a substantially constant attitude. This effectively compensates for the different positions on the plate at which the particles impinge, particularly if the flow control valve or gate, and the sensing plate, are both inclined at substantially the same angle.

The control circuit preferably includes a direct proportional control section and an integrated error section. It may also include an error monitor circuit sensitive to excessive integrated error signals and arranged to actuate a relay or an external warning alarm or other protective circuit.

Figure 2:
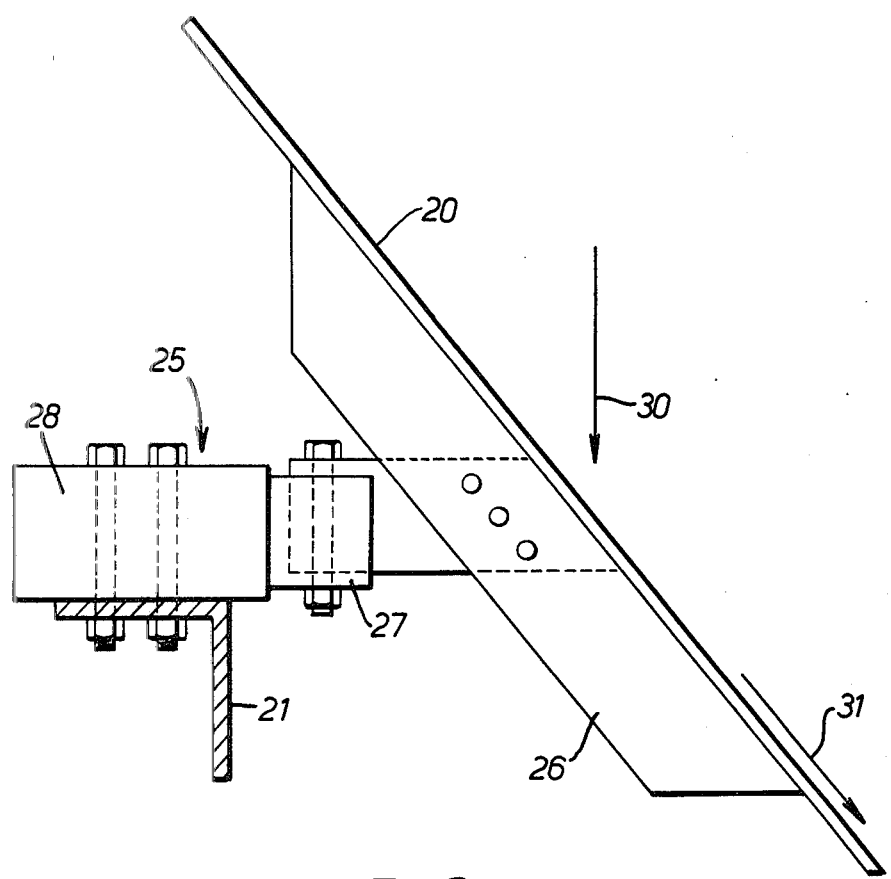
Figure 3:
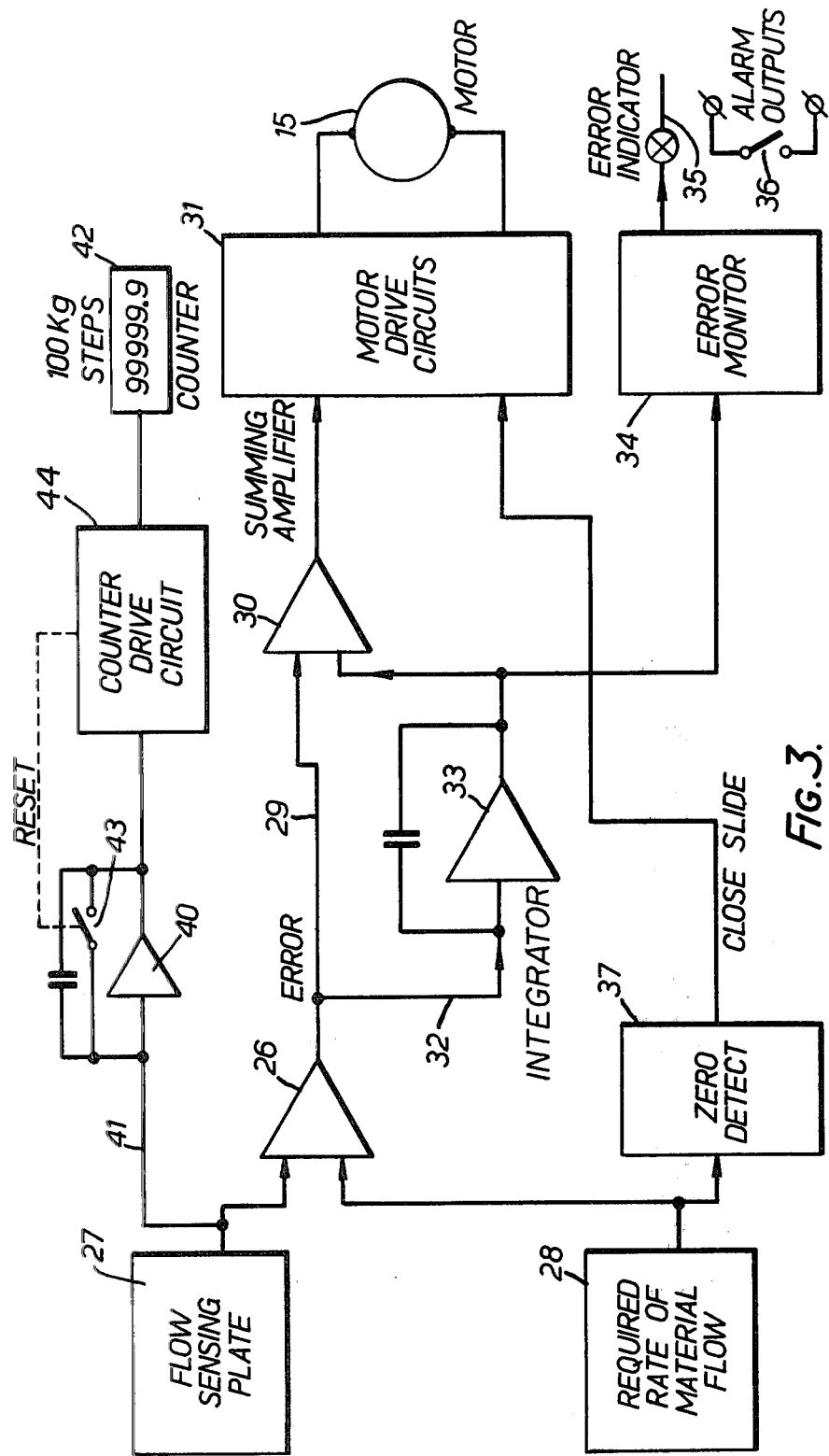

The invention may be performed in various ways and one specific embodiment will now be described by way of example with reference to the accompanying drawings, in which:

FIG. 1 is a diagrammatic sectional side elevation illustrating the main mechanical components of the apparatus, FIG. 2 is a sectional side elevation on an enlarged scale illustrating the mounting of the impact plate and a transducer, and FIG. 3 is a block diagram illustrating the electrical control circuit.

Referring first to FIG. 1, the apparatus comprises a small supply chamber or grain hopper 10 positioned below a vertical feed duct (not shown) in line with a vertical outlet duct 12 which leads to a further metering chamber 13 having a lower outlet duct 14. Across the feed duct 12 is positioned an inclined moving gate valve 15 with an aperture 18 which can thus be moved across the line of the duct, the gate being connected via a lead screw 16 and an internally threaded stationary nut (not shown) to a positioning electric motor 17. The motor is reversible and thus capable of positioning the aperture of the gate accurately in any position to vary the throat of the opening and hence the flow rate of the particles.

In this instance, the particles may be grain and after flowing through the aperture in the gate they fall into the lower metering chamber and impinge on an inclined impact plate 20. The impact sensing plate 20 is mounted on the beam 21 by means of a "bending beam" electromechanical transducer indicated generally at 25. The impact plate is secured to a bracket 26 which is rigidly attached to the projecting end 27 of the transducer, while the mounting or case 28 of the transducer is rigidly secured to the beam 21 extending across the chamber 13. Bending beam transducers are in themselves well known. When a transverse (i.e., vertical) force is exerted on the projecting end 27 a number of internal strain gauges (not shown) arranged in the form of an electrical bridge circuit, provide an output signal which relates to and therefore senses the applied force.

In this particular instance the particle stream falling onto the plate is indicated generally by the arrow 30 and the particles then ricochet or cascade downwards off the plate as shown at 31. When the gate valve 15 is adjusted the horizontal position of the particle stream may vary but surprisingly it is found that this does not seriously affect the signal produced by the transducer. This may be due to the fact that the reaction force exerted on the plate 20 is not purely vertical but has a horizontal component in the direction of the axis of the transducer 25. The total movement of the plate under load may be of the order of 0.1 to 1.0 mm. and the inclination or attitude of the plate is constant. In the present example this inclination is preferably between 30° and 60° from the horizontal. Since the plate 20 and gate valve 15 are approximately parallel, and since the particles fall directly onto the impact plate 20 which is positioned immediately beneath the gate valve 15 the vertical distance remains the same regardless of the adjustment position of the valve plate, and it is of course this vertical distance or "head" which covers the impact velocity of the particles.

The electrical control circuit, illustrated diagrammatically in FIG. 3, includes a differential amplifier or comparator 26 having one input from the sensing load cell 27 and a further input from a datum input unit 28 where the required rate of flow is set. The instantaneous error signal on line 29 is applied via an amplifier 30 to a motor drive circuit system 31, which drives the gate control motor 15. This is a direct proportional control which tends to drive the motor in one direction or the other to reduce the error signal or difference between the sensed load on the impact plate and the pre-selected load at the unit 28. In addition, the error signal from the output of the comparator 26 is fed on line 32 to an integrator circuit 33, the output of which is connected to a second input of the summing amplifier 30. This provides an integrated error signal combined with time and this provides a further compensatory adjustment to the motor 15 and hence the position of the gate valve. This integrated control avoids or reduces inaccuracies caused by the limit of the maximum response time of the proportional control and also compensates for error signals below the minimum resolving capability of the proportional control.

Thus, the integrated error control may be viewed as a relatively long period hunting and damping circuit, which automatically sums the integrated error over a period and operates the motor 15 in a sense to reduce the integrated error. This continues until the integrated error reappears in the opposite sense.

The integrated error signal is monitored also by an error monitor circuit 34, which has an output 35 to an error indicator, and a further relay 36 to operate an external alarm or other protective circuits. These may, for instance, safeguard against failure of the whole apparatus itself or failure of the power supply, or an absence of feed material, or choking up of the output duct for the particle flow.

In addition, the circuit includes a zero detector monitor 37 sensitive to a zero selection at the unit 28 and arranged to operate the motor drive circuits 31 to close the gate valve.

The circuit also includes a totalising counter comprising an integrator 40 with an input 41 direct from the flow sensor 27, and having an output connected to a comparator and counter drive circuit 44 which in turn feeds a final numerical counter 42. This may be arranged to count in 100 Kg steps and after each step the integrator must be re-set, for which purpose the comparator and counter drive circuit 44 is arranged to compare the output voltage to the integrator with preselected voltage and when the two equate the comparator operates a relay whose contacts 43 are connected in a re-set circuit across the integrator. This provides a totalising counter of the total weight sensed by the instrument, quite independently of the error correcting systems.

Instead of an electric motor and motor drive circuit for actuating the gate valve 15 some other form of motor may be used. For example, there may be a pneumatic motor or a hydraulic motor or ram. In any case the motor should preferably be capable of positioning the gate valve accurately and should therefore include some form of proportional control system.

I claim:

1. Apparatus for controlling the rate of flow of a particulate material, comprising a generally vertical duct, a flow control valve positioned in said duct, a motor controlling said valve, a flow rate sensor positioned in said duct (below) immediately beneath said valve, said sensor including an inclined plate onto which the particles will impinge, means supporting said plate for limited movement in a vertical direction, and an electromechanical load cell connected to said plate for sensing the vertical force exerted on said plate by particles falling through said valve, said control valve comprising a movable plate defining an aperture movable within said duct for dispensing the particulate material directly onto the inclined plate, the movable plate being mounted in a plane substantially parallel with but spaced above the plane of said inclined plate, and an electrical control circuit having an input from said sensor and an output connected to said motor for controlling the valve in a sense to close the valve when the sensor detects an increased vertical force.

2. Apparatus according to claim 1 wherein said electrical control circuit further includes means for providing a datum, means for comparing the input from the sensor with the datum to produce a flow error signal, means for integrating the error signal, means for summing the instantaneous error signal with the instantaneous integrated error signal to provide a motor control signal and means coupled to said output for operating the motor for controlling the valve in accordance with the motor control signal.

3. Apparatus according to claim 2 and further including stepped totalising means including a counter, (means for operating the counter each time the sensor detects the passage of a unit weight and means for resetting the operating means each time it operates the counter) means for summing the output of the sensor and a comparator for providing a count signal for operating the counter whenever the summed output represents the passage of a unit weight of material and for resetting the summing means whenever the counter is operated.

4. Apparatus according to claim 1, claim 2 or claim 3, in which said motor is arranged to position said valve accurately at any selected position determined by said control circuit.

5. Apparatus according to claim 4, in which said motor is an electrical motor connected via a reduction gear transmission to a moving part of the valve.

6. Apparatus according to claim 1, claim 2 or claim 3, in which said inclined plate is supported solely by said load cell.

7. Apparatus according to claim 1 or claim 3 in which said control circuit includes a direct proportional control section and an integrated error section.

8. Apparatus according to claim 7, including an error monitor circuit sensitive to excessive integrated error signals and arranged to actuate a warning or protective circuit.

* * * * *